INVENTORS
WILLEM WITZIERS
KAREL M. TIEMES
BY GERRIT STARRE

AGENT

April 21, 1970   W. WITZIERS ET AL   3,507,209
COFFEE-MAKING MACHINE

Filed May 29, 1968   2 Sheets-Sheet 2

INVENTORS.
WILLEM WITZIERS
KAREL M. TIEMES
BY  GERRIT STARRE

AGENT

3,507,209
COFFEE-MAKING MACHINE
Willem Witziers, Karel Martin Tiemes, and Gerrit Starre, Drachten, Netherlands, assignors to U.S. Philips Corporation, New York, N.Y., a corporation of Delaware
Filed May 29, 1968, Ser. No. 732,997
Int. Cl. A23f 1/00
U.S. Cl. 99—307　　　　　　　　　　　　　　　　5 Claims

ABSTRACT OF THE DISCLOSURE

A coffee-making machine with a nonreturn valve in the water container portion thereof. The valve has a conical valve support removably seated in a conical housing and contains a thin flexible material connected along part of its periphery to the valve support so as to permit passage of the water in one direction.

---

The invention relates to a coffee-making machine in which a water container is arranged beside the coffee filter and is provided with a lower draining pipe which is connected through a heating device to an outlet pipe discharging above the filter; the coffee drained from the filter is collected in a vessel.

In such coffee-making machines, a flow of hot water from the water contained to the coffee filter is obtained by arranging the heating device in the vertical part of the lower draining pipe which, viewed in the direction of flow, is closest to the outlet pipe. The supply of heat to the water in the pipe results in a reduction of the specific gravity of the water at the area of the heat supply, so that a flow of water can be adjusted under the influence of the force of gravity.

In coffee-making machines of the kind described, the construction does not allow for the possibility of arranging the heating device at another area, if this should be desirable from a constructional or manufacturing point of view.

These advantages are obviated by the construction in accordance with the invention which is characterized in that the lower draining pipe is connected to the water container through a nonreturn valve.

Due to the presence of the non-return valve, the water in the pipe can flow only from the water container to the outlet pipe, the location of the heating device is no longer essential to the operation of the machine. Development of steam in the heated part of the lower draining pipe results in an excess pressure, so that hot water is pushed to the outlet pipe, whereupon cold water is again supplied from the water container through the nonreturn valve.

Due to the said freedom of construction, coffee-making machines of very compact construction can be obtained.

A preferred embodiment is characterized in that the nonreturn valve is arranged in a valve support detachably secured in a valve housing.

Since satisfactory operation of the machine requires that the nonreturn valve provide a very tight seal in the direction opposite to the flow, the nonreturn valve is the most frequent source of disturbances with respect to the operation of the coffee-making machine. It has been found that such disturbances are due to the presence of scale and other contaminations in the tap-water. It is therefore important that the nonreturn valve should be detachable so that it can be cleaned.

Another embodiment according to the invention, in which the nonreturn valve may be manually removed during the coffee-making process, is characterized in that the valve support is provided with a detaching member extending upwards in the cold water container.

In view of the pulsatory forces acting upon the valve support during the coffee-making process in the direction in which the valve support can be removed from the valve housing, it is required for the valve support to be locked in the valve housing. Moreover, the valve support should be arranged in the valve housing so that leakage between the valve support and the valve housing is prevented. Finally, it is required that the valve support can be detached by the simplest possible manipulation, and hence preferably solely by a drawing movement.

The above requirements are fulfilled by another embodiment of the invention which is characterized in that the valve support is externally provided with an O-shaped ring.

By a suitable choice of valve seats, the frictional force between the valve support and the valve housing will be sufficient for locking.

An embodiment of simple construction can be obtained and is characterized in that the valve support and/or the valve housing are entirely or partly conical on the outer and the inner side, respectively, the diameters decreasing from the upper to the lower side of the water container. The valve support fits more or less like a cork into the valve housing.

In another embodiment, the nonreturn valve consists of a piece of thin flexible material which is connected along part of its periphery to the valve support.

In another embodiment, the valve support is provided with a central opening of passage, while the upper side of the valve support is provided with one or more grooves which begin on the outer side of the valve support and terminate in the central opening.

The invention will now be described more fully with reference to the drawing, which shows diagrammatically an embodiment of the invention and in which.

Figure 1:
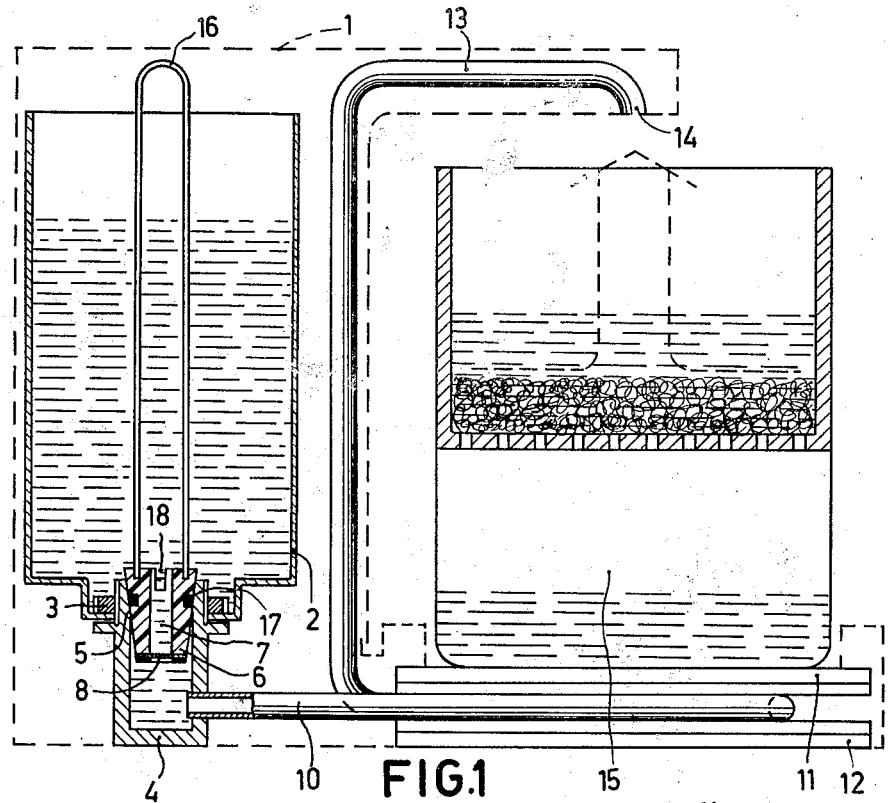
FIGURE 1 is a sectional view of a coffee-making machine.
Figure 2:
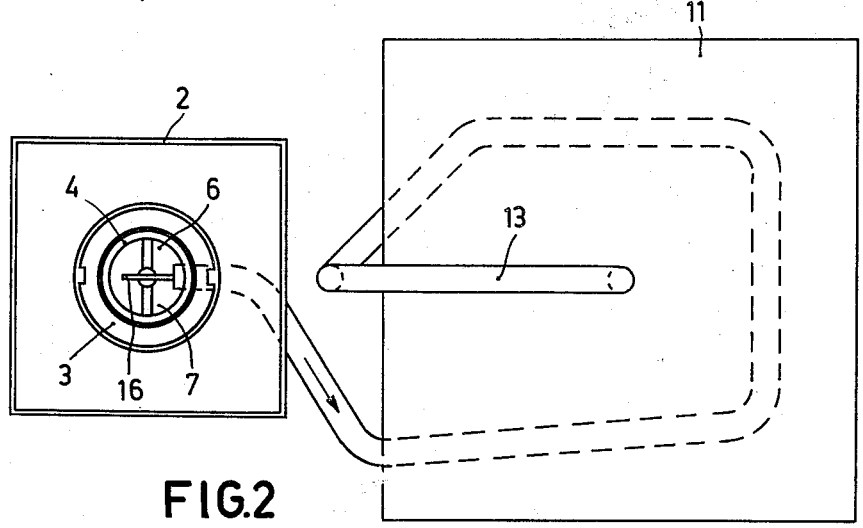
FIGURE 2 is a plan view in which the receptacle and the filter have been omitted.
Figure 3:
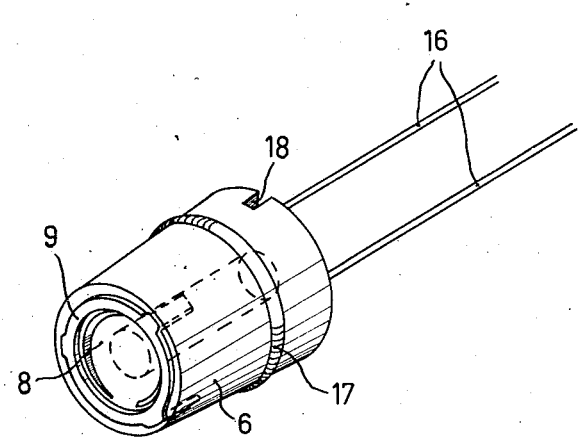
FIGURES 3 and 4 are perspective views of the valve support with valve and detaching member.

The machine comprises a casing 1 which is preferably made of synthetic resin and is shown in broken lines in FIGURE 1. This casing accommodates a cold water container 2 in the base of which is secured a valve housing 4 by means of a nut 3. The valve housing has a partly conical shape or seat at 5 and is tapering just like the nylon support element 6. This support is provided with a central opening 7 and supports on the lower side a nonreturn valve 8 consisting of a thin plate of silicon rubber which is connected along part of its periphery to the valve support by means of a bracket 9 (FIGURE 3).

The valve housing is connected to the lower drain pipe 10 which in this case forms in the horizontal plane a loop between plates 11 and 12 between which is also arranged a heating device (not shown), for example, an electrical heater helix. The lower draining pipe then extends vertically inside the casing 1 and terminates in the outlet pipe 13 with orifice 14.

The plate 11 at the same time serves as supporting plate for the coffeepot 15 which is of the known type having a loose upper part and will not be described.

The valve support 6 is provided with a detaching member in the form of a detaching bracket 16 by which the valve support with the nonreturn valve can be readily withdrawn by hand from the valve housing so that it can be cleaned, for example, by rinsing it with tap-water. If required, this operation may also be carried out during the coffee-making process and it is then advantageous that the detaching bracket 16 always remains cold.

In order to avoid contact between the hand and the water in the cold water container, the detaching bracket 16 projects above the orifice 14 of the outlet pipe 13. Since the cold water container and the lower draining pipe form two communicating vessels, the level in the cold water container cannot rise above the orifice 14 so that the detaching bracket 16 projects above the maximum cold water level.

The valve support is provided on the outer side with an O-shaped ring 17. The O-shaped ring is disposed in the conical part of the valve support, so that the advantage is obtained that in spite of ample seats of valve support and valve housing, which, as is known, has a favourable effect on an economical manufacture, a satisfactory seal and at the same time a satisfactory locking by clamping can always be obtained.

As is apparent from FIGURE 1, the valve housing is disposed in a depression in the base of the cold water container. Thus, the volume of water which can remain in the empty cold water container is reduced. If the cold water container still contains water, a small quantity of such water may flow into the lower draining pipe, resulting in an undesired sudden development of steam.

Figure 4:
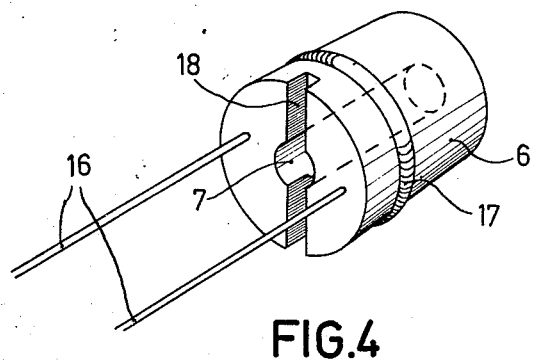

The grooves 18 (FIGURES 1 and 4) fulfill the same function. In the embodiment shown, a separate cold water container 2 is disposed in the casing 1. As an alternative, however, the cold water container may be integral with the casing.

What is claimed is:

1. A coffee making machine comprising a container for cold water, a receptacle for coffee brewing positioned adjacent the water container, a filter element within said receptacle for supporting ground coffee, a drain pipe connected to the water container having an outlet orifice above the filter element, means for heating the drain pipe and water therein, a nonreturn valve in the water container for controlling the water flow in the drain pipe, said valve having a valve support element having an aperture therethrough, a valve housing attached to the water container forming a seat for accommodating the valve support element, a thin flexible material connected along part of its periphery to the valve support element so as to partially block said aperture and permit water flow in one direction, and means extending outside of the water container for removing the valve from the container.

2. A coffee making machine as claimed in claim 1 further comprising grooves formed in the surface of the valve support which is within the container, said grooves connecting the outer periphery of the valve support and the aperture therethrough, and provide access for drainage of the water in the container.

3. A coffee making machine as claimed in claim 2 wherein the means for removing the valve from the water container comprises a bracket affixed to the valve support element and projecting outside of the container.

4. A coffee making machine as claimed in claim 3 wherein the valve seat and valve support are conically shaped and further comprising an O-ring in the conical surface of the valve support to provide a tight seal.

5. A coffee making machine as claimed in claim 4 wherein the thin flexible valve material is silcon rubber.

References Cited

UNITED STATES PATENTS

| 1,852,356 | 4/1932 | Mercier | 99—307 |
| 2,065,211 | 12/1936 | Carvalho | 99—307 |
| 2,881,692 | 4/1959 | Volcov | 99—302 |
| 3,358,583 | 12/1967 | Lepoix | 99—307 |

ROBERT W. JENKINS, Primary Examiner